United States Patent [19]

Shigenobu

[11] Patent Number: 4,629,027
[45] Date of Patent: Dec. 16, 1986

[54] AUTOMATIC SPEED CONTROLLER FOR USE OF A VEHICLE

[75] Inventor: Hiromichi Shigenobu, Toyota, Japan
[73] Assignee: Toyota Jidosha Kabushiki Kaisha, Japan
[21] Appl. No.: 690,204
[22] Filed: Jan. 10, 1985
[30] Foreign Application Priority Data Jan. 16, 1984 [JP] Japan .................................. 59-6169

[51] Int. Cl.⁴ .............................................. B60K 31/00
[52] U.S. Cl. .................................... 180/176; 123/360; 364/424
[58] Field of Search ............... 180/175, 176, 177, 179; 364/431.07, 424; 123/360

[56] References Cited
U.S. PATENT DOCUMENTS 3,741,332 6/1973 Sakakibura .......................... 180/177
4,463,822 8/1984 Tanigawa ............................ 180/177

OTHER PUBLICATIONS

Japanese Laying-open patent publication Sho No. 58-107835.
Japanese Laying-open patent publication Sho No. 57-199012.

Primary Examiner—David M. Mitchell
Attorney, Agent, or Firm—Parkhurst & Oliff

[57] ABSTRACT

An automatic speed controller for use of a vehicle. The automatic speed controller maintains the actual vehicle speed into a preset vehicle apeed. The controller has a vacuum type actuator which is operated by a diaphragm. The diaphragm is actuated buy controlling the volume of an atmospheric pressure to that of a vacuum pressure. If the controller is out of order by any troubles, the atmospheric pressure is positively introduced into the actuator, thereby preventing the actual vehicle speed from being more than the preset vehicle speed.

20 Claims, 5 Drawing Figures

AUTOMATIC SPEED CONTROLLER FOR USE OF A VEHICLE

BACKGROUND OF THE INVENTION

The present invention relates to an automatic speed controller for use in a vehicle, and more particularly to an automatic speed controller which maintains an actual vehicle speed to a preset vehicle speed.

An automatic speed controller has been employed which maintains an actual vehicle speed at a preset vehicle speed. In such an automatic speed controller, an actuator is employed to control a throttle opening to obtain a prescribed vehicle speed which is determined by the vehicle operator. An actuator of the automatic speed controller is controlled by circuits comprised of transistors, diodes, resistors, a microcomputer and so on. These elements are provided on a substrate and are connected to each other.

When a vacuum type actuator is employed in an automatic speed controller, atmospheric pressure or vacuum pressure are alternatively introduced into the actuator in the prescribed cycles, and the rate of atmospheric pressure introduced to the vacuum pressure is varied according to the value of the difference between a preset vehicle speed and a detected actual vehicle speed, thereby adjusting the pressure within the actuator to control the opening of a throttle valve. When vacuum pressure is introduced into the actuator and the control for changing the rate of the atmospheric pressure being introduced to the vacuum pressure breaks because of trouble in the circuits, automatic speed controller cannot maintain the actual vehicle speed at the preset vehicle speed. The result is that the actual vehicle speed becomes higher than the preset vehicle speed.

SUMMARY OF THE INVENTION

The present invention was developed in view of the foregoing background and to overcome the foregoing drawbacks. It is accordingly an object of this invention to provide an automatic speed controller for use in a vehicle which prevents the actual vehicle speed from becoming higher than a preset vehicle speed even when a vacuum type actuator breaks.

To attain the above objects, an automatic speed controller according to the present invention has a throttle means which controls an amount of fuel to be supplied to an engine. An actuating means, designed to actuate the throttle means, is connected with the throttle means. This actuating means is controlled according to a difference between an actual vehicle speed and a preset vehicle speed, by a control means. A cancel means cancels the automatic speed control when a detection means determines that the control means is not operating regularly. The automatic speed controller prevents an actual vehicle speed from becoming higher than a preset vehicle speed even when the actuating device does not operate regularly.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
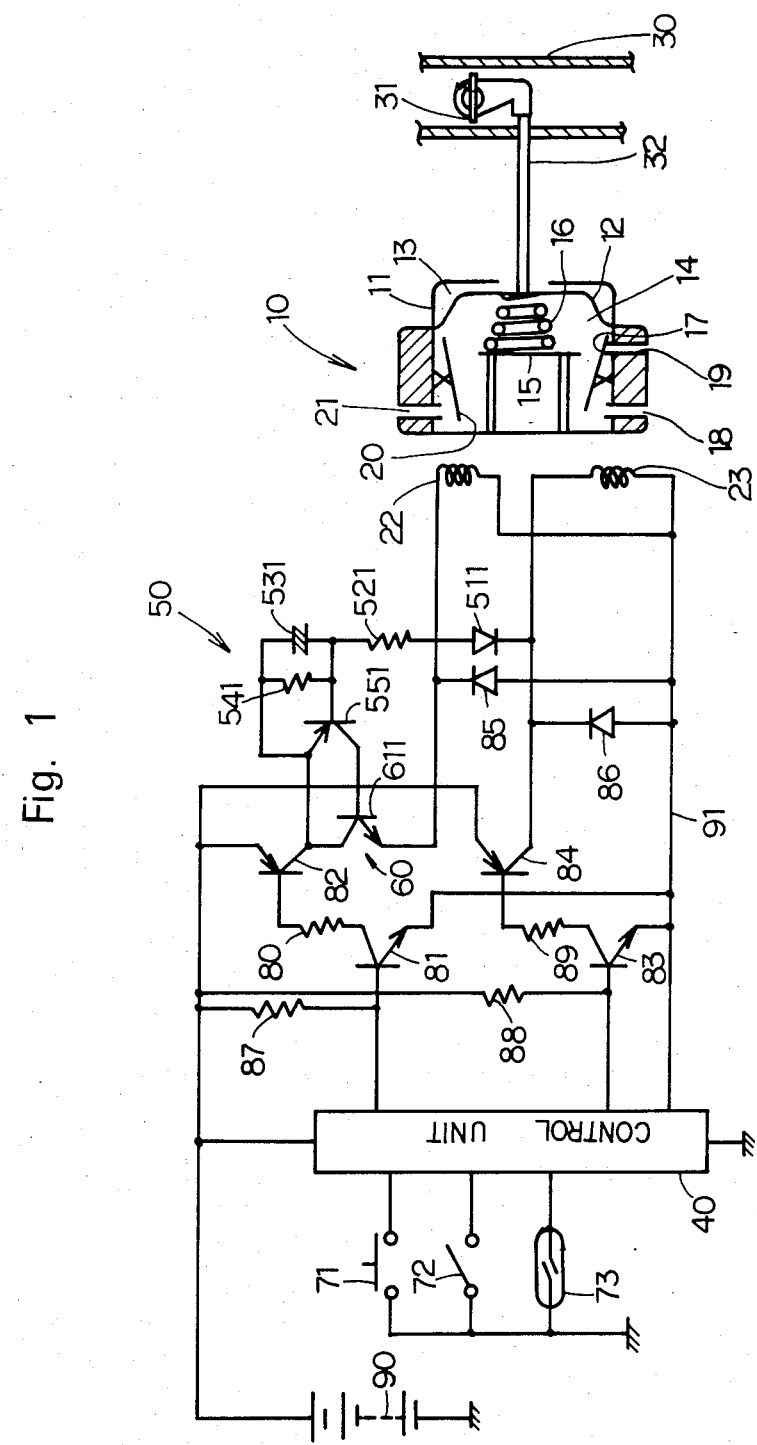
FIG. 1 is a general view which includes a circuit diagram of an automatic speed controller according to a first embodiment of the present invention.

FIG. 1 shows a general view which includes a circuit diagram of an automatic speed controller according to a first embodiment of the present invention. In FIG. 1, the numerals 10 and 40 designate an actuator and control unit respectively. A set switch 71, a cancel switch 72 and a vehicle speed sensor 73 are connected with the control unit 40. A battery 90, which is installed in a vehicle, supplies electric power to the control unit 40. The vehicle speed sensor 73 comprises a lead switch whose on-off cycle is designed to be proportional to the actual vehicle speed. The control unit 40 receives the on-off signal of the vehicle speed sensor 73, and detects the actual vehicle speed. When the set switch 71 is turned ON and an ON signal is inputted to the control unit 40, the control unit 40 memorizes the vehicle speed at the time the ON signal of the set switch 71 is inputted into the control unit 40, as a preset vehicle speed.

The output signals of the control unit 40 are inputted to bases of transistors 81 and 83. When the preset vehicle speed is memorized in the control unit 40 and the automatic speed controller commences control of an actual vehicle speed at a preset value, the control unit 40 successively outputs high-level signals to the base of the transistor 81, and further outputs a duty signal, which indicates a duty rate, to the base of the transistor 83. The duty rate is a rate which indicates an engine load. This duty rate is determined by the value of the difference between the preset vehicle speed and the actual vehicle speed detected by the sensor 73. That is, the control unit 40 compares the preset vehicle speed with the detected vehicle speed, and if the detected vehicle speed is lower than the preset vehicle speed, the control unit 40 increases the duty rate. On the other hand, if the detected vehicle speed is higher than the preset vehicle speed, the control unit 40 lowers the duty rate. Thus, the control unit 40 controls the duty signal outputted to the base of the transistor 83 so that the detected vehicle speed approaches the preset vehicle speed.

When the control unit 40 receives the ON signal from the cancel switch 72 while the vehicle is running at a constant speed, the control unit 40 outputs low-level signals to the bases of the transistors 81 and 83, thereby cancelling the constant speed control. The cancel switch 72 comprises a switch which detects operation of a brake pedal and/or a parking brake (not shown in the drawings). If the vehicle is equipped with a manual transmission, the cancel switch 72 may be a clutch switch which detects the depression of a clutch pedal. If the vehicle is equipped with an automatic transmission, the cancel switch 72 may be a switch which detects when the transmission is in neutral. The detailed structure of the control unit 40 is disclosed in, for instance, a U.S. patent application application Ser. No. 451,839, filed on Jan. 25, 1983 now U.S. Pat. No. 4,516,652.

The base of the N-P-N type transistor 81 is further connected with the battery 90 through a bias resistor 87. The collector of the transistor 81 is connected with a base of a P-N-P type transistor 82 through a resistor 80. The transistor 82 is employed as an amplifier. The emitter of the transistor 81 is connected with a ground 91 which is connected to a vehicle body through the control unit 40. The emitter of the transistor 82 is connected with the battery 90. The collector of the transistor 82 is connected with one end of a solenoid 22 through the collector and emitter of an N-P-N type transistor 611. This arrangement allows the circuit to control the actuator 10.

The base of the N-P-N type transistor 83 is connected with the battery 90 through a bias resistor 88. The collector of the transistor 83 is connected with a base of a P-N-P type transistor 84 through a resistor 89. The transistor 84 is employed as an amplifier. The emitter of the transistor 83 is connected with the ground 91. Further, the emitter of the transistor 84 is connected with the battery 90. The collector of the transistor 84 is connected with a first end of a solenoid 23 thus permitting manipulation of the actuator 10. The other ends of the solenoids 22 and 23 are connected with the ground 91. A diode 85 is provided which is connected with ends of the solenoid 22 at ends thereof. The cathode of the diode 85 is connected with the first end of the solenoid 22. The anode of the diode 85 is connected with the other end of the solenoid 22. Similarly, a diode 86, is provided which is connected with ends of the solenoid 23 at ends thereof. The cathode of the diode 86 is connected with the first end of the solenoid 23. The anode of the diode 86 is connected with the other end of the solenoid 23.

In FIG. 1, a detection circuit 50 comprises a diode 511, resistors 521 and 541, a condenser 531 and a P-N-P type transistor 551. The numeral 60 designates a cancel circuit, and comprises the N-P-N type transistor 611. A cathode of a diode 511, which is employed to prevent counter current from flowing, is connected with the first end of the solenoid 23. The anode of the diode 511 is connected with the first end of the condenser 531 through the resistor 521. Another end of the condenser 531 is connected with the collector of the transistor 82. A resistor 541 is provided which is connected with both ends of the condenser 531. The resistor 541 applies a bias resistance to the transistor 551. Each end of the emitter and base of the transistor 551 is connected with an end of the resistor 541. The collector of the transistor 551 is connected with the base of the transistor 611. The collector and emitter of the transistor 611 are connected with the collector of the transistor 82 and one end of the solenoid 22, respectively.

The actuator 10, as shown in FIG. 1, is a vacuum type actuator, and is controlled by the solenoids 22 and 23. The energization and deenergization of the solenoids 22 and 23 control the opening of a throttle valve 31. A casing 11 of the actuator 10 defines a space therein. This space is separated by a diaphragm 12, into two chambers 13 and 14. The chamber 13 is in constant communication with the atmosphere. The chamber 14 communicates with the atmosphere through ports 18 and 21, and also communicates with an intake passage of an engine through a port 19. The ports 18 and 19 are alternatively opened or closed by a switch valve 17. The port 21 is designed to be opened or closed by a control valve 20. This switch valve 17 and control valve 20 are designed to be actuated by the solenoids 23 and 22 respectively. When the solenoids 23 and 22 are deenergized, the valves 17 and 20 are positioned as shown in FIG. 1. That is, the valve 17 closes the port 19 and opens the port 18. The control valve 20 opens the port 21. When both the solenoids 23 and 22 are energized, the valve 17 opens the port 19, and the ports 18 and 21 are closed. One end of a rod 32 is connected with a diaphragm 12, and another end of the rod 32 is connected with the throttle valve 31 which is located within the throttle body 30. The diaphragm 12 changes its shape according to the degree of vacuum pressure within the chamber 14. The opening of the throttle valve 31 is controlled by the position of the diaphragm 12. The diaphragm 12 is constantly biased by a spring 16 which is supported by a retainer 15 at one end thereof, in such a direction so as to increase the capacity of the chamber 14. That is, the spring 16 biases the diaphragm 12 in such a direction so as to close the throttle valve 31. The throttle valve 31 is designed to be connected with an accelerator pedal (not shown in drawings). The opening of the throttle valve 31 is independently controlled by the actuation of the accelerator pedal.

In operation of the above-described automatic speed controller according to the first embodiment, when the set switch 71 is in the ON position while a vehicle is running in order to commence automatic control of an actual vehicle speed at a constant speed, the control unit 40 memorizes the vehicle speed at the time when the set switch 71 is turned on, as a preset vehicle speed, and subsequently the automatic vehicle speed control is commenced. When the automatic speed control is commenced, the control unit 40 outputs a high level signal to the base of the transistor 81, and further outputs a duty signal to the transistor 83. This duty signal indicates a duty rate which is determined by the difference between the preset vehicle speed and a detected vehicle speed. The transistor 81 is turned ON, and the transistor 83 is periodically turned ON or OFF. When the transistor 81 is turned ON, the transistor 82 also is turned ON. In this condition, if the transistor 611 is ON, the solenoid 22 is energized. When the transistor 83 is turned ON or OFF, the transistor 84 is also turned periodically becomes ON or OFF, thereby periodically energizing the solenoid 23.

Figure 4:
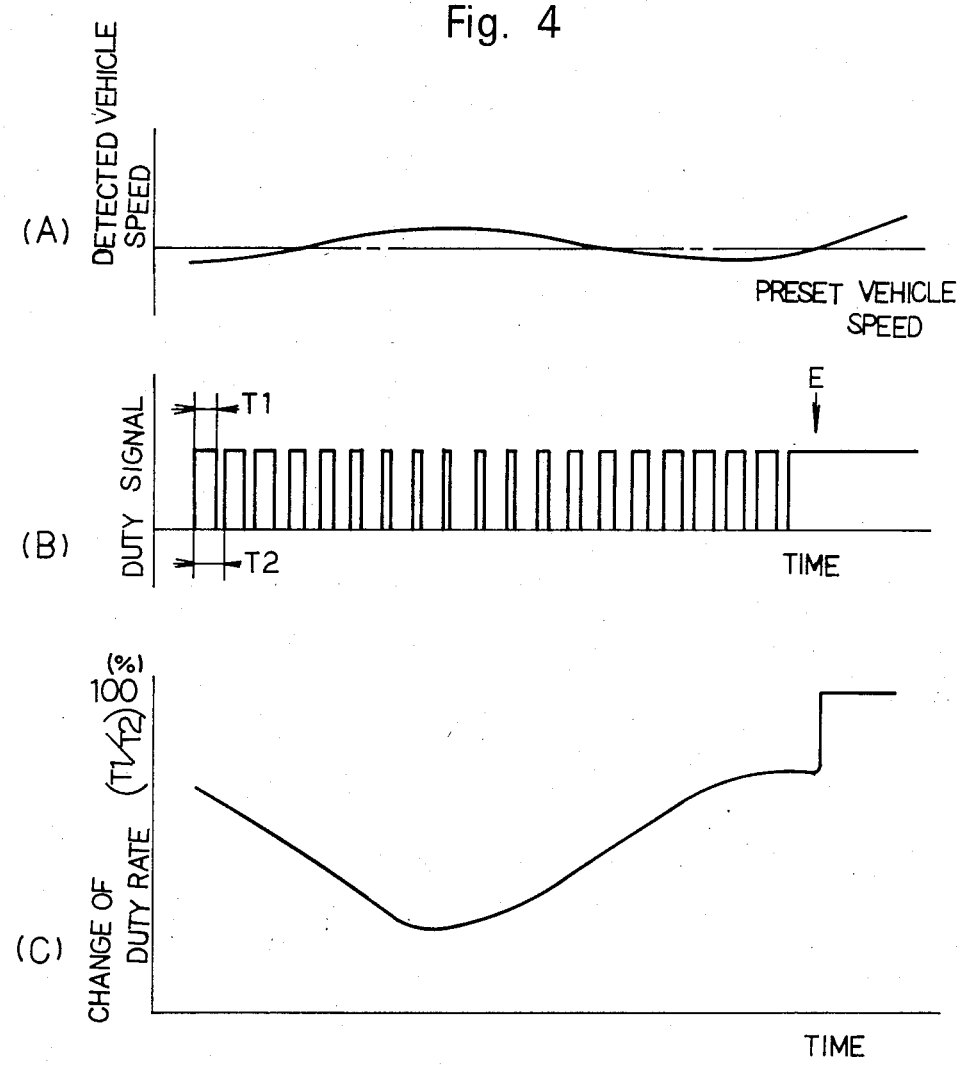
FIG. 4 is a graph which illustrates a detected vehicle speed, a duty signal, and a variation of a duty rate.

When the solenoid 22 is energized, the valve 20 is actuated to close the port 21. When the solenoid 23 is periodically energized, the valve 17 is actuated to alternatively close the port 18 or 19. Thus, when the port 21 is closed, and the port 18 or 19 is alternatively closed, the air pressure within the chamber 14 is determined by the amount of the time the port 18 is closed and the port 19 is opened, and the amount of time the port 18 is opened and the port 19 is closed. The ratio of the time of opening of the port 18 to opening of the port 19 is determined by the duty rate of the duty signal which is outputted from the control unit 40. The diaphragm 12 changes its shape according to the pressure within the chamber 14. The change of the form of the diaphragm 12 is transmitted to the throttle valve 31 through the rod 32, thereby determining the degree of the opening of the throttle valve 31. As a result, the duty rate of the duty signal, which is outputted from the control unit 40, determines the opening of the throttle valve 31. FIG. 4 shows a duty signal and a change of a duty rate in conjunction with the relationship between a preset vehicle speed and a detected vehicle speed.

Figure 5:
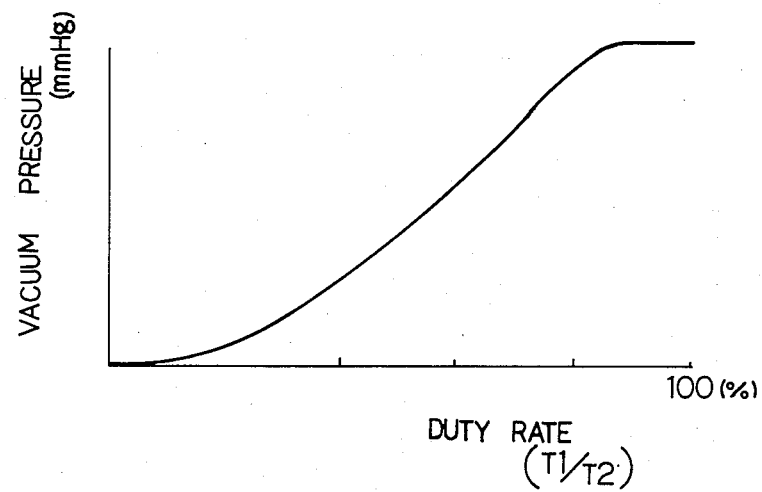
FIG. 5 is a graph which shows the relationship between a vacuum pressure and a rate of an introduced atmospheric pressure to an introduced vacuum pressure.

In detail, FIG. 4(A) shows the change of a detected vehicle speed relative to a preset vehicle speed. FIG. 4(B) shows a duty signal which is outputted from the control unit 40. FIG. 4(C) shows the change of a duty rate which corresponds to the duty signal shown in FIG. 4(B). As shown in FIGS. 4(A), (B) and (C), when the detected vehicle speed is lower than the preset vehicle speed, the duty rate ($T_1/T_2$) is determined to be a large value which is almost proportional to the difference between the detected vehicle speed and the preset vehicle speed. On the other hand, when the detected vehicle speed is higher than the preset vehicle speed, the duty rate is determined to be a small value which is almost inversely proportional to the difference between the detected vehicle speed and the preset vehicle speed. FIG. 5 shows the relationship between the vacuum pressure within the chamber 14 of the actuator 10 and a duty rate. As shown in FIG. 5, the vacuum pressure within the chamber 14 of the actuator 10 becomes inversely smaller as the duty rate increases. The vacuum pressure within the chamber 14 of the actuator 10 reaches a maximum value when the duty rate is approximately 90%.

When the cancel switch 72 is turned ON while the vehicle is running at a constant speed, the control unit 40 does not output a high level signal to the base of the transistor 81, nor is the duty signal outputted to the base of the transistor 83. Both the transistors 81 and 82 are turned OFF. Both the transistors 83 and 84 are also turned OFF. As a result, both the solenoids 22 and 23 are deenergized. Hence, the valve 20 opens the port 21, and the valve 17 opens the port 18 and closes the port 19. Atmospheric pressure is introduced into the chamber 14 through the ports 21 and 18. The diaphragm 12 and the rod 32 return to the position shown in FIG. 1 by the bias force of the spring 16, thereby closing the opening of the throttle valve 31 to cancel the automatic speed control.

When the vehicle is running at a constant speed, the transistor 551 of the detection circuit 50 is ON, and the transistor 611 of the cancel circuit 60 turns on, thereby energizing the solenoid 22. In detail, one end of the condenser 531 of the detection circuit 50 is connected with one end of the solenoid 23 through the resistor 521 and the diode 511. Another end of the condenser 531 is connected with the battery 90 through the collector and emitter of the transistor 82. Hence, when the solenoid 23 is periodically energized at the prescribed duty rate, the condenser 531 is charged or discharged during the same periods as those of the solenoid 23. In other words, when the solenoid 23 turns off, the side of the condenser 531, which is connected with the battery 90, is charged as an anode electrode, and the opposite side of the condenser 531, which is connected with the resistor 521, is charged as a cathode. On the other hand, when the solenoid 23 turns on, charged electrons are discharged through the resistor 541. Hence, a prescribed electric voltage is constantly generated at the points of both of the ends of the resistor 541. This electric voltage causes the transistor 551 to constantly be turned on while the vehicle is running at a constant speed. As a result of the transistor 551 being on, the base current is supplied to the transistor 611, thereby turning on the transistor 611.

When the control unit 40 is out of order and successively high-level signals are outputted to the base of the transistor 83 instead of the duty signal (as shown in FIG. 4(B) by the reference "E"), the solenoid 23 is successively turned on. Hence, the condenser 531 of the detection circuit 50 is not periodically charged. Subsequently, the transistor 551 is maintained on by the discharge of the condenser 531. When a sufficient electric voltage to turn on the transistor 511 is not generated between both ends of the resistor 541 according to the lapse of the discharge, the transistor 551 turns off. If the transistor 551 turns off, a base current is not supplied to the transistor 611 of the cancel circuit 60, thereby turning off the transistor 611.

If the solenoid 23 is turned on successively instead of periodically, the valve 17 remains in a condition whereby the valve 17 closes the port 18 and opens the port 19, and the vacuum pressure within the chamber 14 of the actuator 10 reaches a maximum, thereby opening the throttle valve 31 to a great extent. As a result, as shown in FIG. 4(A), the detected vehicle speed exceeds the preset vehicle speed. When the detection circuit 50 detects that the solenoid 23 is not periodically turned on, the transistor 611 of the cancel circuit 60 turns off, thereby turning off the solenoid 22. The valve 20 opens the port 21, and atmospheric pressure is introduced into the chamber 14 of the actuator 10 through the port 21. As a sufficient volume of atmospheric pressure is introduced into the chamber 14 through the port 21, the vacuum pressure within the chamber 14 is diluted, and the throttle valve 31 is gradually closed. As a result, the actual vehicle speed also drops.

Figure 2:
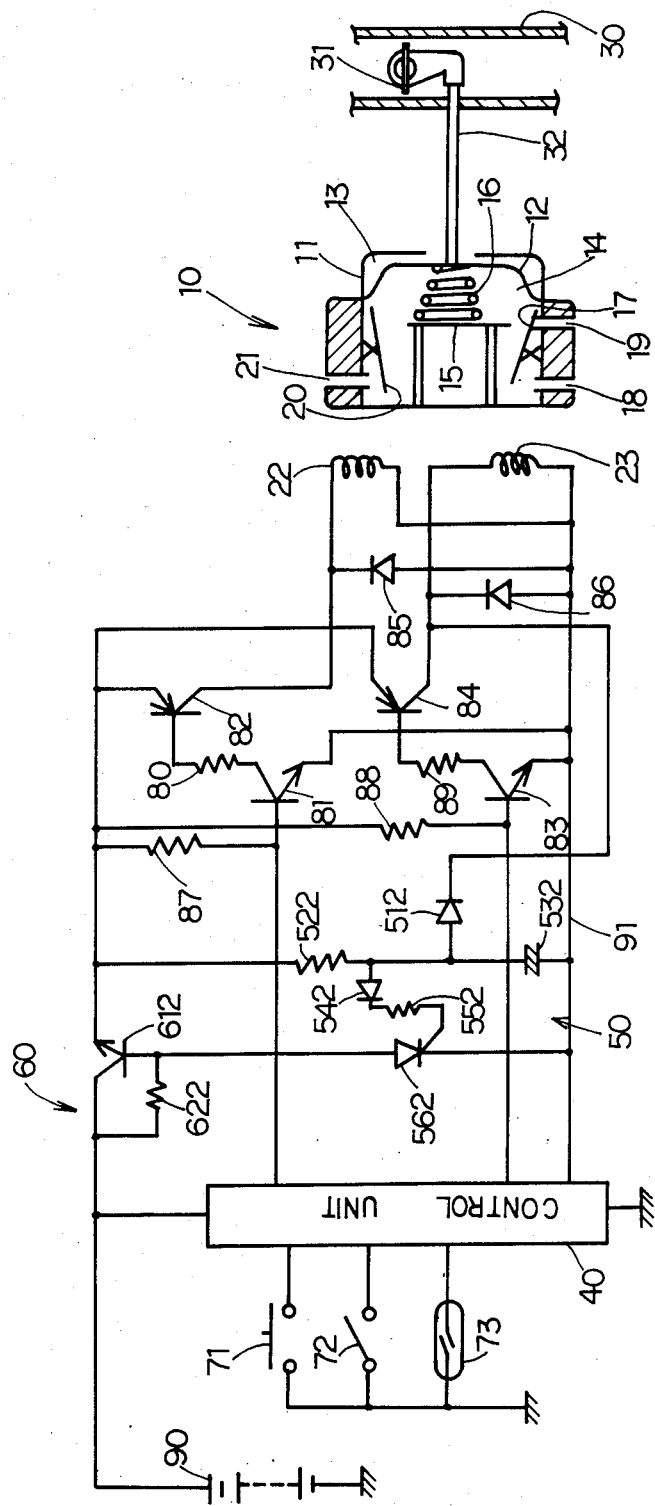
FIG. 2 is a circuit diagram of an automatic speed controller according to a second embodiment of the present invention.

FIG. 2 shows a circuit diagram of an automatic speed controller according to a second embodiment of the present invention. The second embodiment differs from the first embodiment in the structure of the detection circuit 50 and the cancel circuit 60.

The detection circuit 50 according to the second embodiment comprises diodes 512 and 542, resistors 522 and 552, a condenser 532, and a thyristor 562. The cancel circuit 60 comprises an N-P-N type transistor 612 and a resistor 622. The cathode of the diode 512, which is employed to prevent reverse current flow, is connected with one end of a solenoid 23. The anode of the diode 512 is connected with a first end of the condenser 532. Another end of the condenser 532 is connected with a ground 91. The first end of the condenser 532 is connected with an emitter of the transistor 612 through a resistor 522. Further, the first end of the condenser 532 is connected with a gate of the thyristor 562 through the diode 542, which provided a voltage level shift and through the resistor 552. The anode of the thyristor 562 is connected with a base of the transistor 612, and the cathode of the thyristor 562 is connected with a ground 91. The collector and emitter of the transistor 612 are provided between the battery 90 and the emitters of the transistors 82 and 84. A resistor 622 is provided between the base and collector of the transistor 612.

The operation of the detection circuit 50 and the cancel circuit 60 are explained hereunder.

As the thyristor 562 is initially turned OFF, the transistor 612 turns ON. When the automatic speed control functions properly and the solenoid 23 periodically turns on, the condenser 532 is charged through the transistor 612 at a time when the solenoid 23 turns on.

The condenser 532 is discharged through the diode 512 and the solenoid 23 at a time when the solenoid 23 turns off. As the capacity of the discharge is designed to be more than that of the charge, the electric voltage at one end of the condenser 532 is not higher than the voltage required to turn on the thyristor 562.

If the control unit 40 breaks and the solenoid 23 does not turn on periodically but instead turns on successively, the condenser 532 is designed not to discharge through the diode 512 and the solenoid 23, and the electric voltage of the condenser 532 at its one end becomes high. Hence, an electric current flows into the gate of the thyristor 562 through the diode 542 and the resistor 552, thereby turning on the thyristor 562. If the thyristor 562 turns on, the base current of the transistor 612 does not flow, and the transistor 612 turns off, thereby disconnecting the communication between the transistors 82, 84 and battery 90. Hence, both the solenoids 22 and 23 are deenergized, thereby cancelling the automatic speed control.

Figure 3:
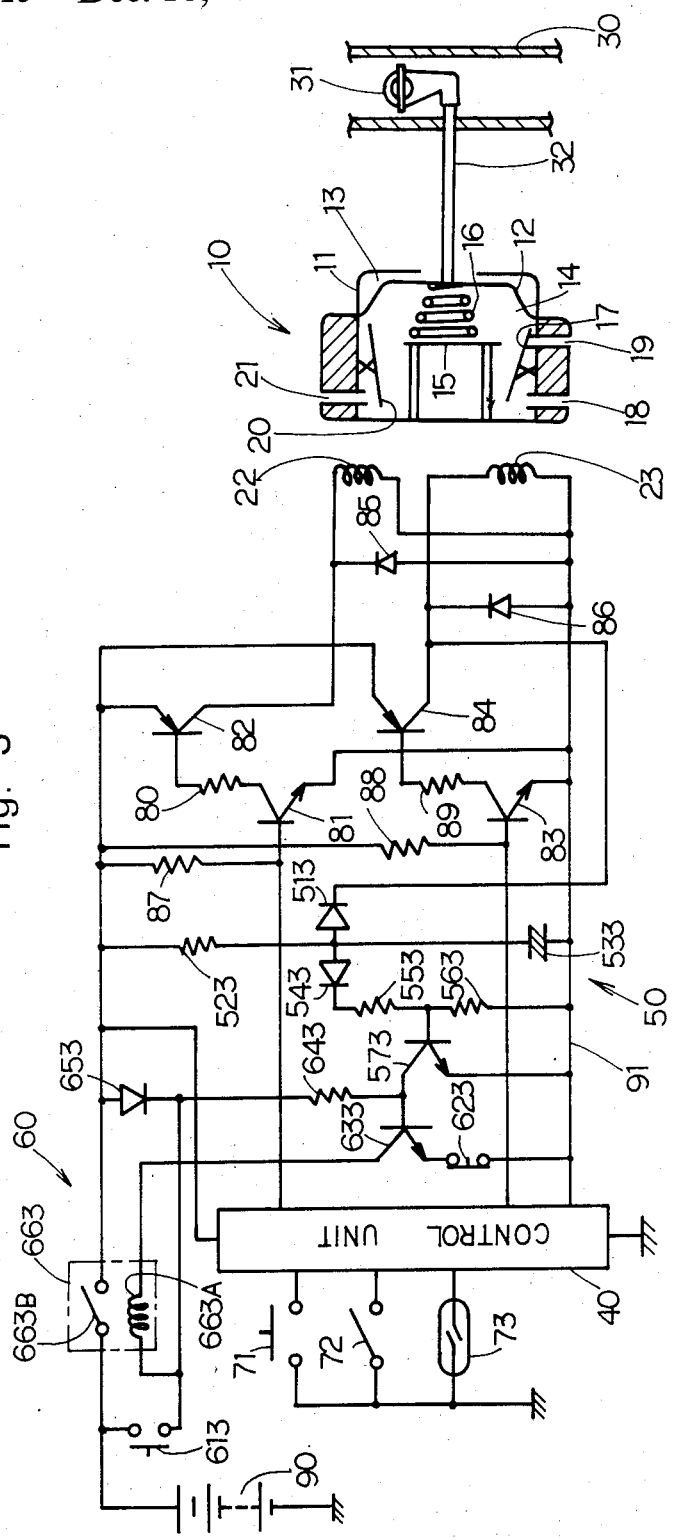
FIG. 3 is a circuit diagram of an automatic speed controller according to a third embodiment of the present invention.

FIG. 3 shows a circuit diagram of an automatic speed controller according to a third embodiment of the present invention. The third embodiment differs from the first and second embodiments in the structure of detection circuit 50 and cancel circuit 60.

The detection circuit 50 of the third embodiment comprises diodes 513 and 543, resistors 523, 553 and 563, a condenser 533, and an N-P-N type transistor 573. The cancel circuit 60 comprises a momentary-off switch 623, an N-P-N type transistor 633, a resistor 643, a diode 653, and a relay 663. The cathode of the diode 513, which is employed in the detection circuit 50 to prevent the current from inversely flowing, is connected with one end of the solenoid 23. The anode of the diode 513 is connected with one end of the condenser 533. The one end of the condenser 533 is connected with a switch 663B of the relay 663 through the resistor 523, and is further connected with the base of the transistor 573 through the diode 543 which provides a voltage level shift and the resistor 553. The other end of the condenser 533 is connected with the ground 91. The base of the transistor 573 is connected with the ground 91 through the resistor 563 for biasing the base. The collector of the transistor 573 is connected with the switch 663B of the relay 663 through the resistor 643 and the diode 653. Diode 653 is employed to prevent reverse flow of the current. The emitter of the transistor 573 is connected with the ground 91. The base of the transistor 633 of the cancel circuit 60 is connected with the collector of the transistor 573. The collector of the transistor 633 is connected with a coil 663A of the relay 663. The emitter of the transistor 633 is connected with the ground 91 through the momentary-off switch 623. The switch 663B of the relay 663 is provided at the position between the battery 90 and the control unit 40. This position of the relay 663 is located between the battery 90 and the emitters of the transistors 82 and 84. One end of the coil 663A of the relay 663 is connected with the battery 90 through the momentary-on switch 613, and is further connected with the switch 663B through the diode 653. Another end of the coil 663A is connected with the collector of the transistor 633. The relay 663 is connected so that the relay 663 maintains its position when the switch 663B is turned ON.

The operation of the detection circuit 50 and the cancel circuit 60 according to the third embodiment are explained hereunder.

According to the third embodiment, to start the automatic speed control, the momentary-on switch 613 is actuated to be ON. The actuation of the switch 613 turns the transistor 633 ON, and subsequently the switch 663B of the relay 663 is turned ON. When the momentary-on switch 613 is turned ON, the base current flows to the transistor 633 through the resistor 643, and hence the transistor 633 is turned ON, thereby energizing the coil 663A of the relay 663. When the coil 663A is energized, the switch 663B is turned ON. When the switch 663B is turned ON, the voltage of the battery 90 is supplied to the control unit 40 or the emitters of the transistors 82 and 84, and the automatic speed control is ready to start.

When the switch 663B is turned ON, the current flows to the coil 663A through the diode 653. If the momentary-on switch 613 is not subsequently triggered and turned OFF, the coil 663A of the relay 663 continues to be energized, and the switch 663B stays ON.

If the automatic speed control subsequently starts, the solenoid 23 is periodically energized. Hence, the condenser 533 is charged through the resistor 523 at a time when the current is supplied to the solenoid 23. The condenser 533 is discharged through the diode 513 and the solenoid 23 at a time when the current does not flow to the solenoid 23. In this condition, as the capacity of the discharge is designed to be more than that of the charge, the voltage of the condenser 533 at its one end is not high enough to turn the transistor 573 ON.

If the control unit 40 breaks and the current is supplied to the solenoid 23 successively instead of periodically, the condenser 533 stops the discharge through the diode 513 and the solenoid 23. The voltage of the condenser 533 at its one end increases, and hence the base current is supplied to the transistor 573 through the diode 543 and the resistor 553. The transistor 573 is turned ON. When the transistor 573 is turned ON, the base current is not supplied to the transistor 633. Hence, the transistor 633 is turned OFF, and the coil 663A of the relay 663 is not supplied with the current. Hence, the switch 663B of the relay 663 is turned OFF, and the current stops the supply from the battery 90 to the control unit 40 and the emitters of the transistors 82 and 84. Hence, the automatic speed control is cancelled.

When the momentary-on switch 613 is turned ON and the switch 663B of the relay 663 is turned ON and the voltage of the battery 90 is supplied to each circuit, the current path of the coil 663A of the relay 663 is disconnected, thereby turning the switch 663B OFF. In other words, the switch 663B of the relay 663 is designed to be turned OFF by the actuation of the momentary-off switch 623.

While the present invention has been described in its preferred embodiments, it is to be understood that the invention is not limited thereto, and may be otherwise embodied within the scope of the following claims.

What is claimed is:

1. An automatic speed controller for use in a vehicle, which maintains an actual vehicle speed at a vehicle speed preset by an operator, comprising:

a throttle means for controlling an amount of fuel supplied to an engine;

an actuation means connected with the throttle means to actuate the throttle means, the actuation means including a first and a second valve means;

a control means for controlling the actuation means according to a difference between an actual vehicle speed and a preset vehicle speed and for adjusting the actual vehicle speed so that it approaches the preset vehicle speed, said control means including a first valve actuating means for actuating said first valve and a second valve actuating means for actuating said second valve, said control means periodically outputting a first signal to said first valve actuating means and continuously outputting a second signal to said second valve actuating means, whereby during regular operation of said control means said first valve actuating means receives said first signal, said first valve means being periodically actuated and said second valve actuating means receives said second signal, said second valve means being continuously actuated;

a detection means for receiving said first signal from said control means and for detecting if the control means is operating regularly, said detection means including a condensor means which is electrically connected to said first valve actuating means, whereby when said detection means receives said first signal, said condensor means is periodically charged and discharged and the detection means determines that the control means is operating regularly, and when the detection means does not receive said first signal, said condensor means is not periodically charged and discharged and the detection means determines that the control means is not operating regularly, said detection means outputting a detect signal when said condensor means is not periodically charged and discharged; and a cancel means for receiving said detect signal from said detect means and for cancelling said control of said actuation means by said control means when the detection means determines that the control means is not operating regularly, said cancel means being electrically connected to the detection means and said second valve actuating means, whereby when said cancel means receives said detect signal, said cancel means outputs a cancel signal to said second valve actuating means which does not actuate said second valve means, said non-actuating of said second valve means preventing said actuation means from actuating said throttle means.

2. The automatic speed controller of claim 1, wherein the throttle means is a throttle valve which is rotatably mounted within an intake passage.

3. The automatic speed controller of claim 2, wherein the actuation means comprises
a casing with a space being defined within said casing,
a diaphragm which separates said space into at least a first and a second chamber,
a rod including a first end and a second end, said first end being connected with the diaphragm, said second end being connected with the throttle means, and
a biasing means which constantly biases the diaphragm in such a direction as the throttle means decreases the amount of fuel being supplied into the engine.

4. The automatic speed controller of claim 3, wherein said first valve functions to alternatively open or close a first port through which a first fluid having a first pressure is introduced into said first chamber and a second port through which a second fluid having a second pressure is introduced into said first chamber, said second pressure being lower than the first pressure, said control means controlling a ratio of the time of opening of said first port to the time of opening of said second port according to the difference between the actual vehicle speed and the preset vehicle speed.

5. The automatic speed controller of claim 4, wherein said second valve functions to open a third port, said second valve opening said third port when the detection means detects that the control means is not operating regularly.

6. The automatic speed controller of claim 5, wherein the first and third fluid comprise atmospheric air, and the second fluid is intake air within an intake pipe of the engine.

7. The automatic speed controller of claim 3, wherein the bias means is a coil spring.

8. The automatic speed controller of claim 5, further comprising a first solenoid which functions to actuate said first valve and a second solenoid which functions to actuate said second valve.

9. A method for automatically controlling the speed of a vehicle comprising:
memorizing a desired vehicle speed;
detecting an actual vehicle speed;
determining a difference between said desired vehicle speed and said actual vehicle speed;
adjusting said actual vehicle speed using a control means so that said actual vehicle speed approaches said desired vehicle speed, said control means periodically outputting a first control signal which actuates a first valve means and continuously outputting a second control signal which actuates a second valve means;
supplying said first control signal to a condensor which periodically charges and discharges;
detecting whether said control means is functioning properly by monitoring said charge and discharge of said condensor;
outputting a detect signal when said control means is not functioning properly; and
cancelling said automatic speed control when said detect signal is received by cancelling said second signal.

10. The method for automatically controlling the speed of a vehicle according to claim 9, wherein said actual vehicle speed is adjusted by adjusting an opening of a throttle valve.

11. The method for controlling the speed of a vehicle according to claim 9, wherein said first valve means and said second valve means are in communication with a first chamber, said first chamber being partially enclosed by a diaphragm.

12. The method for automatically controlling the speed of a vehicle according to claim 11, wherein said second valve means communicates said first chamber with atmospheric air, said continuous actuation of said second valve means continuously holding said second valve means in a closed position.

13. The method for automatically controlling the speed of a vehicle according to claim 12, wherein when said detect signal is received by said cancel means and said continuous second signal is interrupted, said second valve means is opened.

14. The method for automatically controlling the speed of a vehicle according to claim 13, wherein when said second valve means is opened and said first chamber is in said communication with said atmospheric air, said diaphragm is displaced, thereby closing said throttle valve.

15. The method for automatically controlling the speed of a vehicle according to claim 14, wherein said first valve means functions to alternatively open a first port and a second port, said first port functioning to communicate said first chamber with atmospheric air, said second port functioning to communicate said first chamber with a vacuum.

16. The method for automatically controlling the speed of a vehicle according to claim 15, wherein a ratio of a time of opening of said first port to a time of opening of said second port is determined based upon said difference.

17. The method for automatically controlling the speed of a vehicle according to claim 9, wherein said control means is not functioning properly when said condensor is not charging and discharging.

18. The method for automatically controlling the speed of a vehicle according to claim 15, wherein said first valve means is controlled by a first solenoid and said second valve means is controlled by a second solenoid.

19. A method for automatically controlling the speed of a vehicle comprising:
  memorizing a desired vehicle speed;
  detecting an actual vehicle speed;
  calculating a difference between said desired vehicle speed and said actual vehicle speed;
  adjusting said actual vehicle speed using a control means so that said actual vehicle speed approaches said desired vehicle speed, said control means periodically outputting a first control signal which actuates a first valve means and continuously outputting a second control signal which actuates a second valve means, said first valve means alternatively opening a first port and a second port, said first port communicating a first chamber with atmospheric air, said second port communicating said first chamber with a vacuum, said second valve means opening and closing a third port which communicates said first chamber with atmospheric air, a ratio of the time of opening of said first port to the time of opening of said second port being determined from said difference between said desired vehicle speed and said actual vehicle speed;
  supplying said first signal to a condensor which periodically charges and discharges;
  detecting whether said control means is functioning properly from said charge and discharge of said condenser;
  outputting a detect signal when said condenser is not charging and discharging; and
  cancelling automatic speed control when said detect signal is outputted by outputting a cancel signal which opens said second valve means.

20. The method according to claim 19, wherein when said difference increases said ratio decreases, and when said difference decreases said ratio increases.

* * * * *